(12) United States Patent
Ishii et al.

(10) Patent No.: US 9,131,503 B2
(45) Date of Patent: Sep. 8, 2015

(54) MOBILE STATION, BASE STATION, TRANSMISSION METHOD AND COMMUNICATION CONTROL METHOD

(75) Inventors: Hiroyuki Ishii, Tokyo (JP); Hiromasa Umeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 135 days.

(21) Appl. No.: 13/805,982

(22) PCT Filed: Jun. 20, 2011

(86) PCT No.: PCT/JP2011/064081
§ 371 (c)(1),
(2), (4) Date: Dec. 20, 2012

(87) PCT Pub. No.: WO2011/162216
PCT Pub. Date: Dec. 29, 2011

(65) Prior Publication Data
US 2013/0183993 A1    Jul. 18, 2013

(30) Foreign Application Priority Data

Jun. 21, 2010 (JP) ................................. 2010-141082

(51) Int. Cl.
| | | |
|---|---|---|
| H04W 72/00 | (2009.01) | |
| H04W 72/04 | (2009.01) | |
| H04W 8/22 | (2009.01) | |
| H04W 36/14 | (2009.01) | |
| H04W 24/00 | (2009.01) | |
| H04W 88/06 | (2009.01) | |

(52) U.S. Cl.
CPC ............ *H04W 72/0453* (2013.01); *H04W 8/22* (2013.01); *H04W 24/00* (2013.01); *H04W 36/14* (2013.01); *H04W 88/06* (2013.01)

(58) Field of Classification Search
USPC .............. 455/509, 452.2, 513, 515, 561, 445, 455/436, 452.1; 370/320, 235, 330, 328, 370/437, 431, 329, 338
See application file for complete search history.

(56) References Cited

U.S. PATENT DOCUMENTS

2006/0046773 A1* 3/2006 Aycin et al. ................. 455/552.1
2006/0114870 A1* 6/2006 Buckley et al. ............... 370/338

(Continued)

FOREIGN PATENT DOCUMENTS

| CN | 101243652 A | 8/2008 |
|---|---|---|
| WO | 2010/006289 A2 | 1/2010 |

OTHER PUBLICATIONS

International Search Report w/translation from PCT/JP2011/064081 mailed on Aug. 23, 2011 (2 pages).

(Continued)

*Primary Examiner* — Charles Appiah
*Assistant Examiner* — Alexander Yi
(74) *Attorney, Agent, or Firm* — Osha Liang LLP

(57) ABSTRACT

A mobile station includes, where the mobile station supports a first frequency band and a second frequency band, an information element generating unit configured to generate an information element indicating at least one of whether a receiver sensitivity is degraded in the second frequency band, whether a certificate has been obtained for communications in the second frequency band, and whether transmission and reception bands of the mobile station correspond to a portion of a bandwidth of the second frequency band, and a transmitting unit configured to transmit the generated information element.

10 Claims, 7 Drawing Sheets

(56) References Cited

U.S. PATENT DOCUMENTS

2006/0135067 A1* 6/2006 Dunko .................. 455/41.2
2006/0160550 A1* 7/2006 Edwards ................ 455/509
2007/0275722 A1* 11/2007 Thorson et al. ........... 455/436

OTHER PUBLICATIONS

Written Opinion of the International Searching Authority from PCT/JP2011/064081 mailed on Aug. 23, 2011 (3 pages).
3GPP TS 25.101 V10.1.0; "3rd Generation Partnership Project; Technical Specification Group Radio Access Network; User Equipment (UE) radio transmission and reception (FDD) (Release 10)," Apr. 2011 (271 pages).
3GPP TS 36.101 V10.2.1; "3rd Generation Partnership Project; Technical Specification Group Radio Access Network; Evolved Universal Terrestrial Radio Access (E-UTRA); User Equipment (UE) radio transmission and reception (Release 10)," Apr. 2011 (225 pages).
3GPP TS 36.331 V9.2.0; "3rd Generation Partnership Project; Technical Specification Group Radio Access Network; Evolved Universal Terrestrial Radio Access (E-UTRA); Radio Resource Control (RRC); Protocol specification (Release 9)," Mar. 2010 (248 pages).
3GPP TS 36.101 V9.3.0; "3rd Generation Partnership Project; Technical Specification Group Radio Access Network; Evolved Universal Terrestrial Radio Access (E-UTRA); User Equipment (UE) radio transmission and reception (Release 9)," Mar. 2010 (172 pages).
Office Action issued in counterpart Chinese Patent Application No. 201180030034A dated Nov. 17, 2014 (19 pages).

* cited by examiner

MOBILE STATION, BASE STATION, TRANSMISSION METHOD AND COMMUNICATION CONTROL METHOD

TECHNICAL FIELD

The present invention relates to a mobile station, a base station, a transmission method, and a communication control method.

BACKGROUND ART

For mobile communications, frequency bands are defined according to a frequency allocation rule in each country (see TS 36.101 V9.3.0). For example, in a frequency band 1, an uplink band is defined as 1920 MHz to 1980 MHz and a downlink band is defined as 2110 MHz to 2170 MHz.

DISCLOSURE OF INVENTION

Problem(s) to be Solved by the Invention

A frequency range such as the frequency band 1 (2 GHz band), frequency allocation in each country is the same, because frequency allocation is internationally considered. However, a frequency band practically used for mobile communications is typically determined according to a rule or a circumstance in each country. Thus, although the same frequency range (800 MHz band) is used, frequency allocation may be different depending on countries. The frequency range is a frequency region classified according to its use. One or more frequency bands can be defined in the frequency range and can be used for mobile communications.

FIG. 1 shows an example of frequency allocation in each country. A frequency band A is used in a country A, a frequency band B is used in a country B, and a frequency band C is used in a country C.

A frequency band D including these frequency bands A-C can be defined and can be used in a country D. However, in the frequency band D, transmission and reception bands become wider while the separation between the transmission frequency and the reception frequency is the same, which makes a duplexer more difficult to manufacture compared to the frequency bands A-C. For this reason, a receiver sensitivity of a mobile station operating according to the frequency band D is lower than a receiver sensitivity of a mobile station operating according to one of the frequency bands A-C. Conversely, a receiver sensitivity of a mobile station operating according to one of the frequency bands A-C is higher than a receiver sensitivity of a mobile station operating according to the frequency band D. In this manner, the receiver sensitivity varies depending on the transmission and reception bands and the separation between the transmission frequency and the reception frequency.

Typically, it is desirable that a mobile station be used in all countries. For example, assuming that a mobile station supporting the frequency band D also supports the frequency band A or the frequency band B, the mobile station can be used not only in the country D but also in the country A or B. In this manner, an increase in roaming revenue and an improvement in customer convenience can be expected by supporting plural frequency bands.

Similarly, assuming that a mobile station supporting the frequency band A also communicates in a portion of the frequency band D, an increase in roaming revenue and an improvement in customer convenience can be expected.

However, as described above, when the mobile station supporting the frequency band D roams into one of the frequency bands A-C, the receiver sensitivity is degraded. In other words, downlink coverage becomes smaller.

In addition, depending on the country, it is necessary to obtain a certificate for communications. The certificate means that a property such as transmission power during communications satisfies a predetermined requirement. Even though a certificate is obtained in one country, another certificate may be needed in another country. Alternatively, when a certificate is obtained in one country, a predetermined requirement for communications may also be satisfied in another country. For example, it is assumed that communications are not allowed under the requirement in the country A and the country B unless a certificate is obtained. The mobile station supporting the frequency band D may not have obtained the certificate in the roaming-target country A or B (certificate for communications in the roaming-target frequency band). In this case, communications by the mobile station without obtaining the certificate are not allowed, even though communications are possible from the viewpoint of a property of the mobile station.

On the other hand, when the mobile station supporting the frequency band A roams into the frequency band C or D, the mobile station does not wholly support the bandwidth of the roaming-target frequency band, but supports only a portion of the bandwidth (the overlapping portion between the frequency band A and the frequency band C or the overlapping portion between the frequency band A and the frequency band D).

When communications are always prohibited in this case, an increase in roaming revenue or an improvement in customer convenience may be lost.

It is a general object of the present invention to enable roaming of a mobile station even though frequency allocation is different depending on countries.

Means for Solving the Problem(s)

In one aspect of the present invention, there is provided a mobile station including:

where the mobile station supports a first frequency band and a second frequency band, an information element generating unit configured to generate an information element indicating at least one of whether a receiver sensitivity is degraded in the second frequency band, whether a certificate has been obtained for communications in the second frequency band, and whether transmission and reception bands of the mobile station correspond to a portion of a bandwidth of the second frequency band; and a transmitting unit configured to transmit the generated information element.

In another aspect of the present invention, there is provided a base station including:

where a mobile station supports a first frequency band and a second frequency band, a receiving unit configured to receive an information element indicating at least one of whether a receiver sensitivity is degraded in the second frequency band, whether a certificate has been obtained for communications in the second frequency band, and whether transmission and reception bands of the mobile station correspond to a portion of a bandwidth of the second frequency band; and a control unit configured to control communications with the mobile station based on the received information element.

In another aspect of the present invention, there is provided a transmission method in a mobile station comprising the steps of:

where the mobile station supports a first frequency band and a second frequency band, generating an information element indicating at least one of whether a receiver sensitivity is degraded in the second frequency band, whether a certificate has been obtained for communications in the second frequency band, and whether transmission and reception bands of the mobile station correspond to a portion of a bandwidth of the second frequency band; and transmitting the generated information element.

In another aspect of the present invention, there is provided a communication control method in a base station comprising the steps of:

where a mobile station supports a first frequency band and a second frequency band, receiving an information element indicating at least one of whether a receiver sensitivity is degraded in the second frequency band, whether a certificate has been obtained for communications in the second frequency band, and whether transmission and reception bands of the mobile station correspond to a portion of a bandwidth of the second frequency band; and controlling communications with the mobile station based on the received information element.

Advantageous Effect of the Invention

According to an embodiment of the present invention, roaming of a mobile station is enabled even though frequency allocation is different depending on countries.

DETAILED DESCRIPTION OF THE PREFERRED EMBODIMENTS

In an embodiment of the present invention, it is assumed that a mobile station roams into a different frequency band when frequency allocation is different depending on countries. The whole corresponding bandwidth or a portion of the corresponding bandwidth of the different frequency band overlaps with the whole bandwidth or a portion of the bandwidth of the original frequency band. In this case, communications have to be controlled in consideration of the following points:

(1) whether a receiver sensitivity in the roaming-target frequency band is degraded, (2) whether a certificate has been obtained for communications in the roaming-target frequency band, and/or (3) whether transmission and reception bands of the mobile station correspond to a portion of the bandwidth of the roaming-target frequency band.

In some cases, one of these three points (1)-(3) has to be considered. In other cases, a combination of these three points (1)-(3) has to be considered.

Meaning that a mobile station roams into a different frequency band may be interpreted that the mobile station supports plural frequency bands. The whole corresponding bandwidth or a portion of the corresponding bandwidth of one of the plural frequency bands overlaps with the whole bandwidth or a portion of the bandwidth of another of the plural frequency bands. In this case, communications have to be controlled in consideration of the following points:

(1) whether a receiver sensitivity in one of the plural frequency bands is degraded, (2) whether a certificate has been obtained for communications in one of the plural frequency bands, and/or (3) whether transmission and reception bands of the mobile station correspond to a portion of the bandwidth of one of the plural frequency bands.

Meaning that a mobile station supports a frequency band may be interpreted that the mobile station supports the frequency band in accordance with its capability. In other words, meaning that a mobile station supports a frequency band may be interpreted that the mobile station can communicate in the frequency band and supports properties such as maximum transmission power, spurious emissions, a receiver sensitivity, blocking, or the like defined for the frequency band. The properties such as maximum transmission power, spurious emissions, a receiver sensitivity, blocking, or the like are defined in TS 36.101, V9.3.0, for example.

Signaling for the capability that the mobile station supports the frequency band may be defined as an information element "SupportedBandEUTRA" in TS 36.331, V9.2.0, for example. The information element "SupportedBandEUTRA" may include an information element "bandEUTRA" indicating a frequency band number (index) and an information element indicating whether the mobile station is a half-duplex mobile station.

Figure 1:
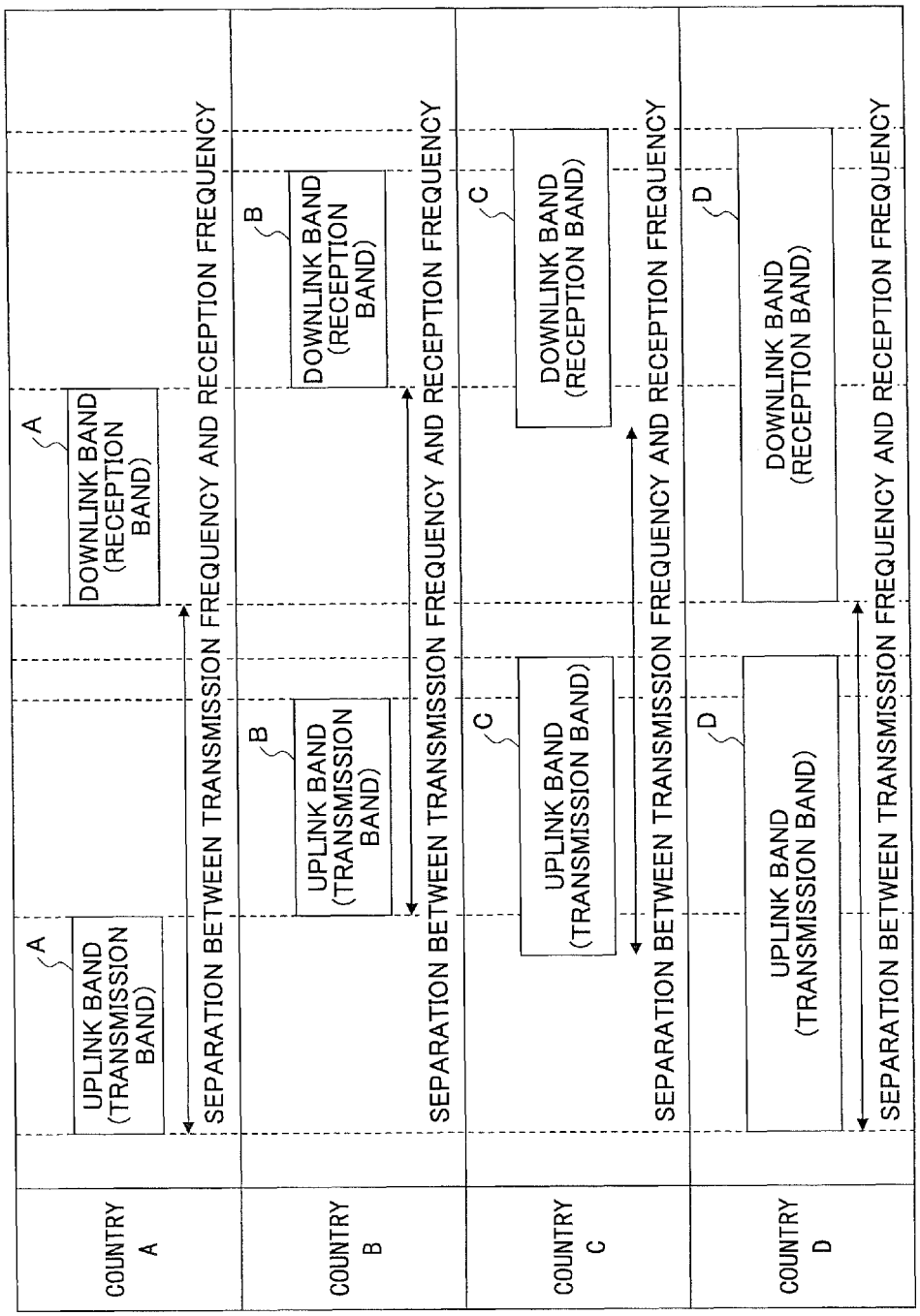
FIG. 1 shows an example of frequency allocation in each country.

In the example of frequency allocation shown in FIG. 1, (1) whether a receiver sensitivity in the roaming-target frequency band is degraded has to be considered when the mobile station operating according to the frequency band D roams into one of the frequency bands A-C. In other words, in the example of frequency allocation shown in FIG. 1, (1) whether a receiver sensitivity in one of the plural frequency bands is degraded has to be considered when the mobile station operating according to the frequency band D supports one or more of the frequency bands A-C.

In the example of frequency allocation shown in FIG. 1, (2) whether a certificate has been obtained for communications in the roaming-target frequency band has to be considered when the mobile station roams into the frequency band A or B assuming that the certificate is needed for communications in the frequency bands A and B. In other words, (2) whether a certificate has been obtained for communications in one of the plural frequency bands has to be considered when the mobile station supports the frequency band A or B assuming that the certificate is needed for communications in the frequency bands A and B.

In the example of frequency allocation shown in FIG. 1, (3) whether transmission and reception bands of the mobile station correspond to only a portion of the bandwidth of the roaming-target frequency band has to be considered when the mobile station supporting the frequency band A or B roams into the frequency band C or D or when the mobile station supporting the frequency band C roams into the frequency band D. In other words, (3) whether transmission and reception bands of the mobile station correspond to only a portion of the bandwidth of one of the plural frequency bands has to be considered when the mobile station supporting the frequency band A or B also supports the frequency band C or D or when the mobile station supporting the frequency band C also supports the frequency band D.

The mobile station transmits an information element indicating one or more of these points (1)-(3) to the base station. The base station controls communications in consideration of the information element indicating one or more of these points (1)-(3). For example, the base station may allow or prohibit communications or may allow communications in a different frequency range (for example, 2 GHz band for which frequency allocation is internationally considered). In this example, it is assumed that the mobile station supports the different frequency range.

With reference to the accompanying drawings, embodiments of the present invention are described in detail below.

<Configuration of a Mobile Station and a Base Station>

Figure 2:
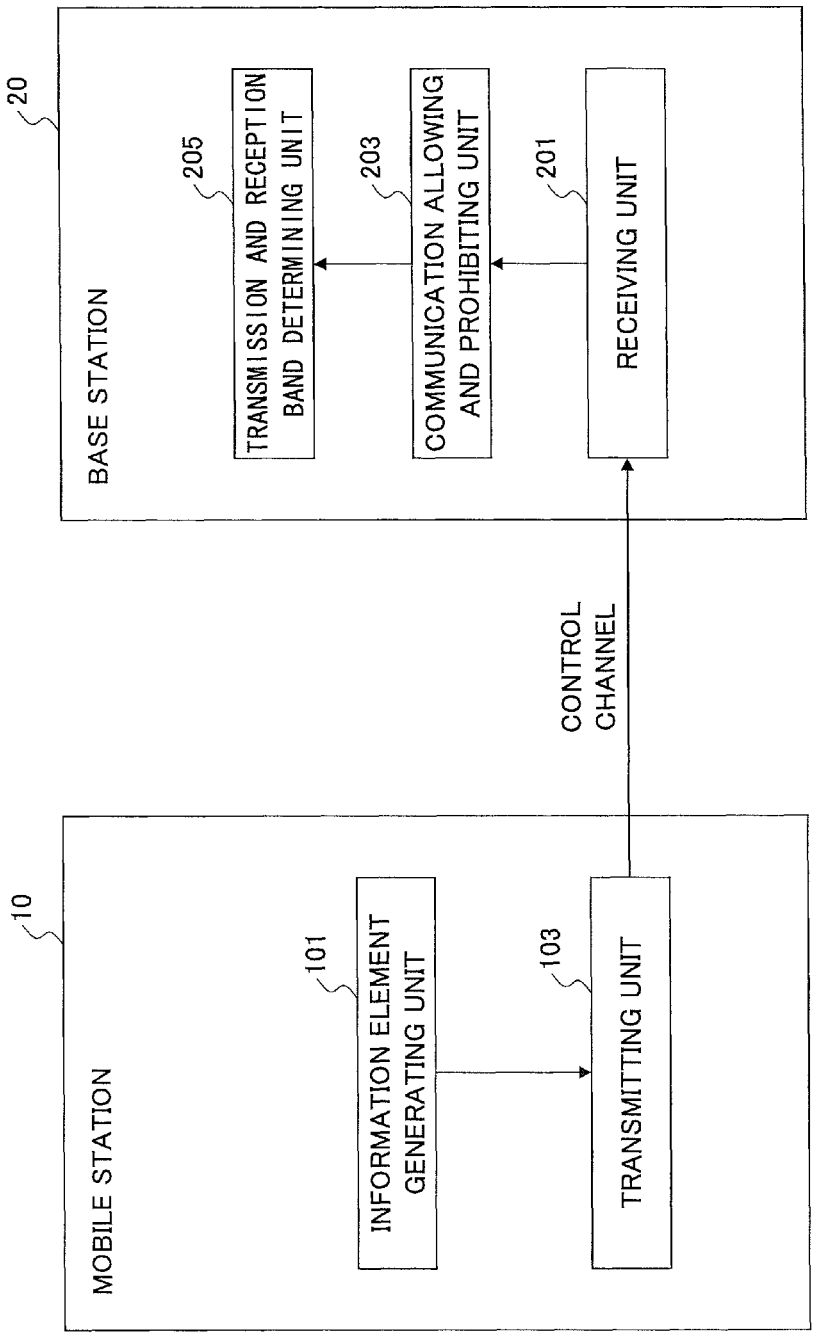
FIG. 2 shows a block diagram of a mobile station and a base station in accordance with an embodiment of the present invention.

FIG. 2 shows a block diagram of a mobile station and a base station in accordance with an embodiment of the present invention.

The mobile station 10 includes an information element generating unit 101 and a transmitting unit 103.

The information element generating unit 101 generates an information element indicating at least one of (1) whether a receiver sensitivity in the roaming-target frequency band is degraded, (2) whether a certificate has been obtained for communications in the roaming-target frequency band, and (3) whether transmission and reception bands of the mobile station correspond to a portion of the bandwidth of the roaming-target frequency band. In other words, the information element generating unit 101 generates an information element indicating at least one of (1) whether a receiver sensitivity in one of plural frequency bands is degraded, (2) whether a certificate has been obtained for communications in one of plural frequency bands, and (3) whether transmission and reception bands of the mobile station correspond to a portion of the bandwidth of one of plural frequency bands.

For example, it is assumed that the mobile station 10 supports the frequency band A and the frequency band D. The information element generating unit 101 generates an information element indicating whether a receiver sensitivity is degraded in the frequency band A and the frequency band D, respectively. This information element may be expressed using one bit. For example, when the receiver sensitivity is degraded in the frequency band, the information element is set to zero. When the receiver sensitivity is not degraded in the frequency band, the information element is set to one. It is also assumed that the mobile station 10 is designed to operate according to the frequency band D. In this example, the information element generating unit 101 sets the information element indicating whether the receiver sensitivity is degraded to zero for the frequency band A and sets the information element indicating whether the receiver sensitivity is degraded to one for the frequency band D. It should be noted that the information element indicating whether the receiver sensitivity is degraded may be provided (generated) only for a frequency band (the frequency band A in this example) in which the receiver sensitivity is assumed to be degraded. In this example, the information element generating unit 101 may set the information element indicating whether the receiver sensitivity is degraded to zero only for the frequency band A, but may not set the information element indicating whether the receiver sensitivity is degraded per se for the frequency band D.

For example, it is assumed that the mobile station 10 supports the frequency band A and the frequency band D. The information element generating unit 101 generates an information element indicating whether a certificate has been obtained for communications in the frequency band A and the frequency band D, respectively. This information element may be expressed using one bit. For example, when the certificate has not been obtained for communications in the frequency band, the information element is set to zero. When the certificate has been obtained for communications in the frequency band, the information element is set to one. It is also assumed that the mobile station 10 does not obtain the certificate for communications in the frequency band A, but obtains the certificate for communications in the frequency band D. In this example, the information element generating unit 101 sets the information element indicating whether the certificate has been obtained for communications in the frequency band to zero for the frequency band A and sets the information element indicating whether the certificate has been obtained for communications in the frequency band to one for the frequency band D. It should be noted that the information element indicating whether the certificate has been obtained for communications in the frequency band may be provided (generated) only for a frequency band (the frequency band A in this example) in which the certificate is needed for communications in the frequency band. In this example, the information element generating unit 101 may set the information element indicating whether the certificate has been obtained for communications in the frequency band to zero only for the frequency band A, but may not set the information element indicating whether the certificate has been obtained for communications in the frequency band per se for the frequency band D.

For example, it is assumed that the mobile station 10 supports the frequency band A. When the mobile station 10 roams from the frequency band A into the frequency band D, the information element generating unit 101 generates an information element indicating that the mobile station 10 supports only a portion of the bandwidth of the frequency band D. This information element may be expressed as bits representing the supported bands or as predetermined bits. The relationship between the predetermined bits and the bands may be determined as the specification of the system. In this example, the information element generating unit 101 generates an information element indicating that the mobile station 10 supports the frequency band A and the frequency band D and an information element indicating that the mobile station 10 supports only a portion of the bandwidth of the frequency band D.

More specifically, the frequency band D may be divided into blocks of 5 MHz size and a bit may be defined for each block. The bit set to zero may indicate that the mobile station 10 supports the corresponding 5 MHz band (block). The bit set to one may indicate that the mobile station 10 does not support the corresponding 5 MHz band (block).

Alternatively, one bit may be defined, for example. The bit set to zero may indicate that the mobile station 10 supports the bandwidth of the frequency band A among the frequency band D. The bit set to one may indicate that the mobile station 10 supports the whole frequency band D.

The transmitting unit 103 transmits the generated information element. For example, the transmitting unit 103 may transmits the generated information element together with a mobile station capability (UE Capability) indicating the capability of the mobile station on a control channel.

The base station 20 includes a receiving unit 201, a communication allowing and prohibiting unit 203, and a transmission and reception band determining unit 205.

The receiving unit 201 receives an information element transmitted from the mobile station 10. As described above, the information element indicates at least one of (1) whether a receiver sensitivity in the roaming-target frequency band is degraded, (2) whether a certificate has been obtained for communications in the roaming-target frequency band, and (3) whether transmission and reception bands of the mobile station correspond to a portion of the bandwidth of the roaming-target frequency band. In other words, the information element indicates at least one of (1) whether a receiver sensitivity in one of plural frequency bands is degraded, (2) whether a certificate has been obtained for communications in one of plural frequency bands, and (3) whether transmission and reception bands of the mobile station correspond to a portion of the bandwidth of one of plural frequency bands.

The communication allowing and prohibiting unit 203 determines whether communications with the mobile station 10 are allowed or prohibited based on the received information element.

For example, it is assumed that the base station 20 provides mobile communication services using the frequency band A and the mobile station 10 is designed to operate according to the frequency band D. In this example, the mobile station 10 reports that the mobile station 10 supports the frequency band D and the frequency band A as a capability, which further includes an information element indicating that the receiver sensitivity is degraded in the frequency band A. In other words, the base station 20 receives from the mobile station 10 an information element indicating that the mobile station 10 supports the frequency band A and the frequency band D and an information element indicating that the receiver sensitivity is degraded in the frequency band A. When the communication allowing and prohibiting unit 203 determines that the receiver sensitivity can be degraded, the communication allowing and prohibiting unit 203 allows communications with the mobile station 10. When the communication allowing and prohibiting unit 203 determines that the degradation of the receiver sensitivity is not preferable, the communication allowing and prohibiting unit 203 does not allow communications with the mobile station 10. Alternatively, when the communication allowing and prohibiting unit 203 determines that the degradation of the receiver sensitivity is not preferable, the communication allowing and prohibiting unit 203 allows communications in another frequency range (for example, 2 GHz band in the case where the frequency bands A and B are within 800 MHz band). In this example, it is assumed that the mobile station 10 supports the 2 GHz band.

For example, it is assumed that the base station 20 provides mobile communication services using the frequency band A and the mobile station 10 supports the frequency band A and the frequency band D. It is also assumed that the mobile station 10 has not obtained a certificate for the frequency band A. In this example, the mobile station 10 reports that the mobile station 10 supports the frequency band A and the frequency band D as a capability, which further includes an information element indicating that the certificate has not been obtained for the frequency band A. In other words, the base station 20 receives from the mobile station 10 an information element indicating that the mobile station 10 supports the frequency band A and the frequency band D and an information element indicating that the certificate has not been obtained for the frequency A. When the communication allowing and prohibiting unit 203 determines that the certificate need not be obtained, the communication allowing and prohibiting unit 203 allows communications with the mobile station 10. When the communication allowing and prohibiting unit 203 determines that the lack of the certificate is not preferable, the communication allowing and prohibiting unit 203 does not allow communications with the mobile station 10. Alternatively, when the communication allowing and prohibiting unit 203 determines that the lack of the certificate is not preferable, the communication allowing and prohibiting unit 203 allows communications in another frequency range (for example, 2 GHz band in the case where the frequency bands A and B are within 800 MHz band). In this example, it is assumed that the mobile station 10 supports the 2 GHz band.

For example, it is assumed that the base station 20 provides mobile communication services using the frequency band D and the mobile station 10 supports the frequency band A and only a portion of the bandwidth of the frequency band D. In this example, the mobile station 10 reports that the mobile station 10 supports the frequency band A and the frequency band D as a capability, which further includes an information element indicating that the mobile station 10 supports only a portion of the bandwidth of the frequency band D. In other words, the base station 20 receives from the mobile station 10 an information element indicating that the mobile station 10 supports the frequency band A and the frequency band D and an information element indicating that the mobile station 10 supports only a portion of the bandwidth of the frequency band D. The communication allowing and prohibiting unit 203 allows communications in the portion of the bandwidth.

The transmission and reception band determining unit 205 determines the transmission and reception bands of the mobile station 10 and provides information about the frequency band to be used for communications to the mobile station 10. For example, the transmission and reception band determining unit 205 may instruct the mobile station 10 to communicate in another frequency range (2 GHz band) or instruct the mobile station 10 to communicate in a portion of the bandwidth when the mobile station 10 supports only the portion of the bandwidth.

<Operation of a Mobile Station and a Base Station>

Figure 3:
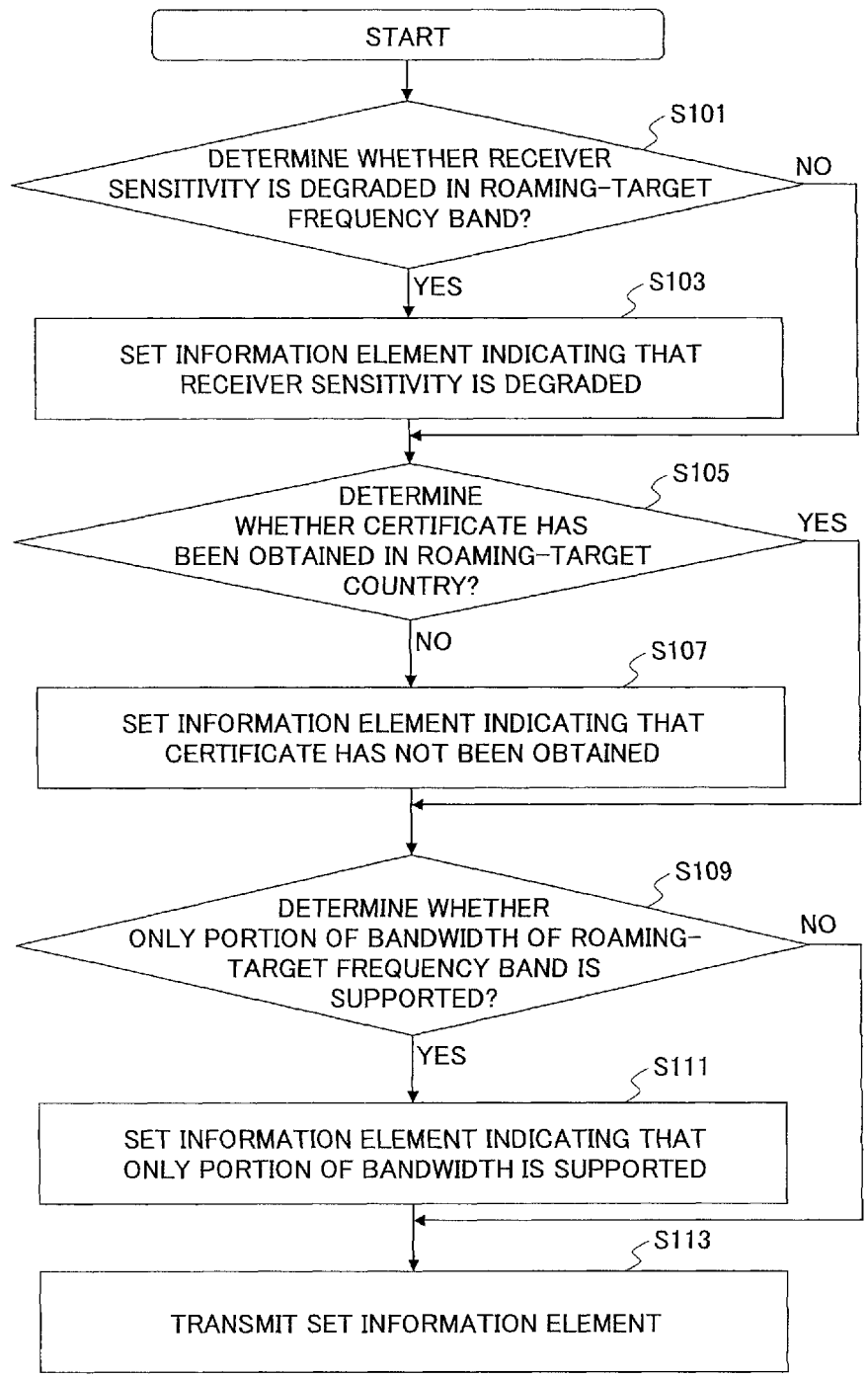
FIG. 3 shows a flowchart of a transmission method in a mobile station in accordance with an embodiment of the present invention.

FIG. 3 shows a flowchart of a transmission method in the mobile station in accordance with an embodiment of the present invention.

Upon roaming, the information element generating unit 101 determines whether the receiver sensitivity is degraded in the roaming-target frequency band (S101). The information element generating unit 101 may determine whether the receiver sensitivity is degraded in both the roaming-source frequency band and the roaming-target frequency band. In other words, when the mobile station 10 supports a first frequency band and a second frequency band, the information element generating unit 101 may determine whether the receiver sensitivity is degraded in the first frequency band or the second frequency band (S101). When the receiver sensitivity is degraded, the information element generating unit 101 generates an information element indicating that the receiver sensitivity is degraded (S103). Otherwise, the information element generating unit 101 may generate an information element indicating that the receiver sensitivity is not degraded.

Then, the information element generating unit 101 determines whether the certificate has been obtained for communications in the roaming-target frequency band (S105). The information element generating unit 101 may determine whether the certificate has been obtained for communications in the frequency band for both the roaming-source frequency band and the roaming-target frequency band. In other words, when the mobile station 10 supports a first frequency band and a second frequency band, the information element generating unit 101 may determine whether the certificate has been obtained for the first frequency band or the second frequency band (S105). When the certificate has not been obtained, the information element generating unit 101 generates an information element indicating that certificate has not been obtained (S107). Otherwise, the information element generating unit 101 may generate an information element indicating that the certificate has been obtained for communications in the frequency band.

Then, the information element generating unit 101 determines whether the mobile station 10 supports only a portion of the bandwidth of the roaming-target frequency band (S109). The information element generating unit 101 may determine whether the mobile station 10 supports only a portion of the bandwidth for both the roaming-source frequency band and the roaming-target frequency band. In other words, when the mobile station 10 supports a first frequency band and a second frequency band, the information element generating unit 101 may determine whether the mobile station 10 supports only a portion of the bandwidth for the first frequency band or the second frequency band (S109). When the mobile station 10 supports only a portion of the bandwidth, the information element generating unit 101 generates an information element indicating that the mobile station 10 supports only the portion of the bandwidth (S111). When the mobile station 10 supports the whole bandwidth, the information element generating unit 10 may not generate an information element indicating that the mobile station 10 supports only a portion of the bandwidth.

The transmitting unit 103 transmits the generated information element (S113).

Figure 4:
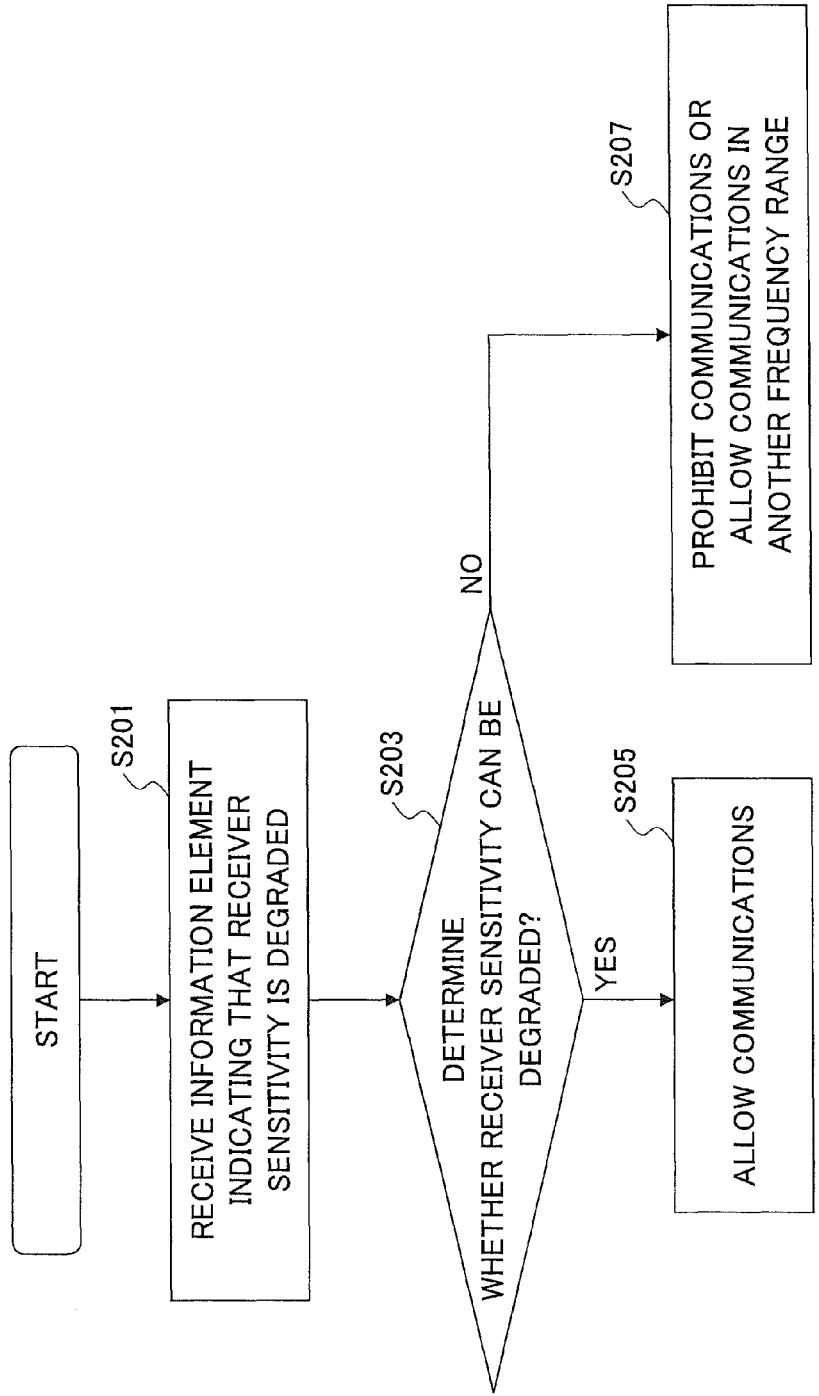
FIG. 4 shows a flowchart of a communication control method in a base station in accordance with an embodiment of the present invention.

FIG. 4 shows a flowchart of a communication control method in the base station in accordance with an embodiment of the present invention.

The receiving unit 201 receives an information element transmitted from the mobile station 10 (S201). In this example, it is assumed that the receiving unit 201 receives the information element indicating that the receiver sensitivity is degraded. The communication allowing and prohibiting unit 203 determines whether the receiver sensitivity can be degraded (S203). When the communication allowing and prohibiting unit 203 determines that the receiver sensitivity can be degraded, the communication allowing and prohibiting unit 203 allows communications with the mobile station 10 (S205). When the communication allowing and prohibiting unit 203 determines that the degradation of the receiver sensitivity is not preferable, the communication allowing and prohibiting unit 203 does not allow communications with the mobile station 10. Alternatively, when the communication allowing and prohibiting unit 203 determines that the degradation of the receiver sensitivity is not preferable, the communication allowing and prohibiting unit 203 allows communications in another frequency range, and the transmission and reception band determining unit 205 determines the transmission and reception bands of the mobile station 10 (S207).

Figure 5:
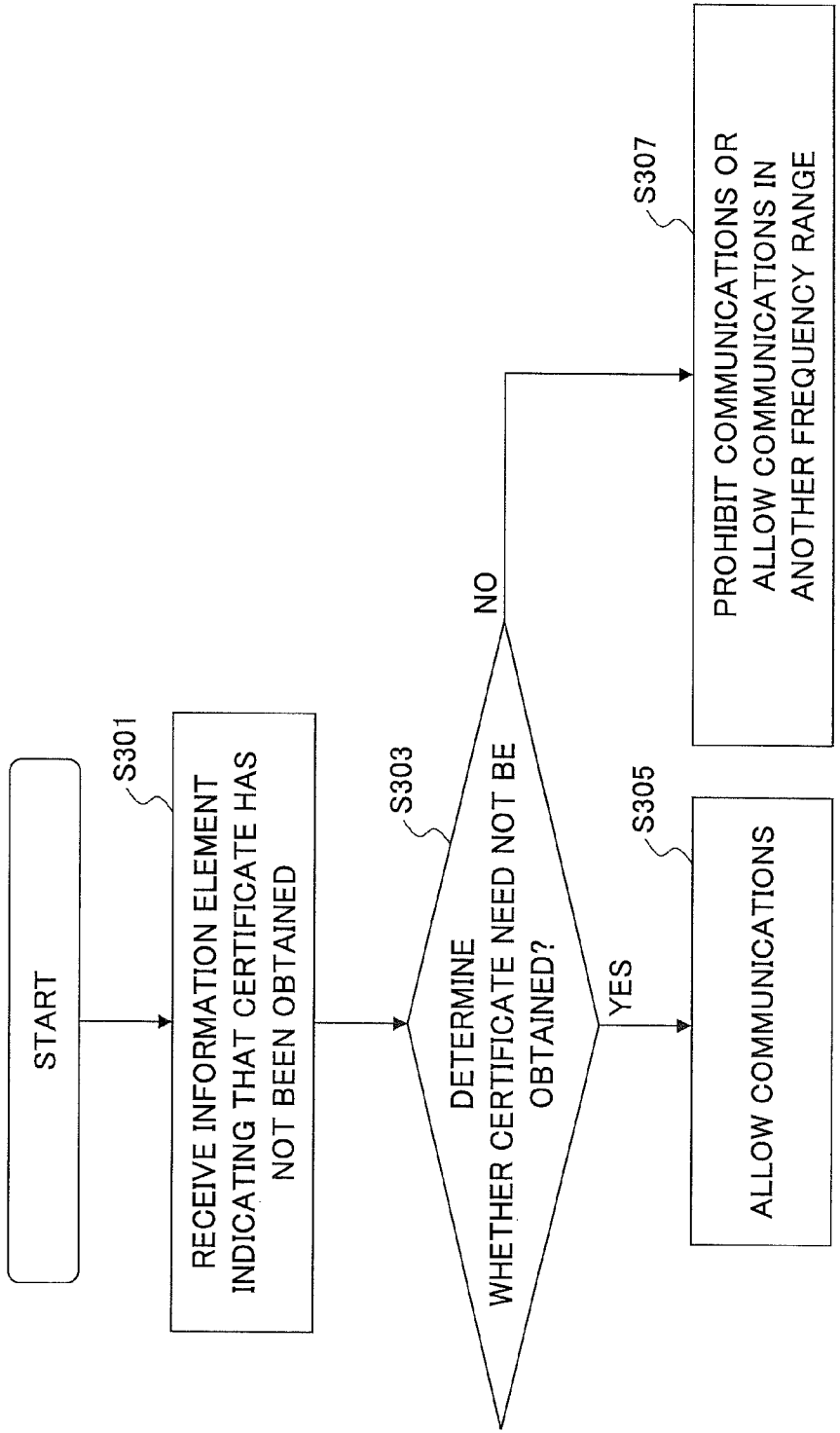
FIG. 5 shows a flowchart of another communication control method in a base station in accordance with an embodiment of the present invention.

FIG. 5 shows a flowchart of another communication control method in the base station in accordance with an embodiment of the present invention.

The receiving unit 201 receives an information element transmitted from the mobile station 10 (S301). In this example, it is assumed that the receiving unit 201 receives the information element indicating that the certificate has not been obtained. The communication allowing and prohibiting unit 203 determines whether the certificate need not be obtained (S303). When the communication allowing and prohibiting unit 203 determines that the certificate need not be obtained, the communication allowing and prohibiting unit 203 allows communications with the mobile station 10 (S305). When the communication allowing and prohibiting unit 203 determines that the lack of the certificate is not preferable, the communication allowing and prohibiting unit 203 does not allow communications with the mobile station 10. Alternatively, when the communication allowing and prohibiting unit 203 determines that the lack of the certificate is not preferable, the communication allowing and prohibiting unit 203 allows communications in another frequency range, and the transmission and reception band determining unit 205 determines the transmission and reception bands of the mobile station 10 (S307).

Figure 6:
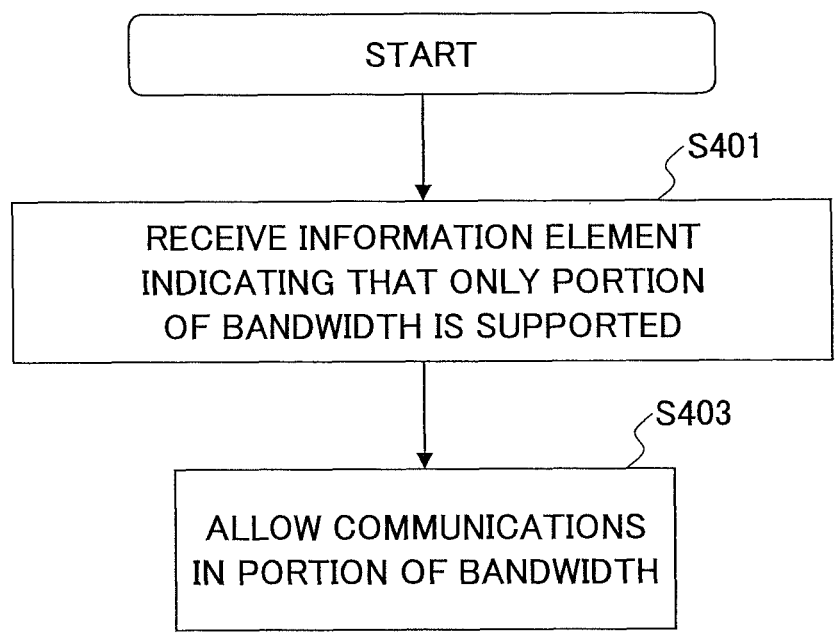
FIG. 6 shows a flowchart of another communication control method in a base station in accordance with an embodiment of the present invention.

FIG. 6 shows a flowchart of another communication control method in the base station in accordance with an embodiment of the present invention.

The receiving unit 201 receives an information element transmitted from the mobile station 10 (S401). In this example, it is assumed that the receiving unit 201 receives the information element indicating that only a portion of the bandwidth is supported. The communication allowing and prohibiting unit 203 allows communication in the portion of the bandwidth, and the transmission and reception band determining unit 205 determines the transmission and reception bands of the mobile station 10 (S403).

Figure 7:
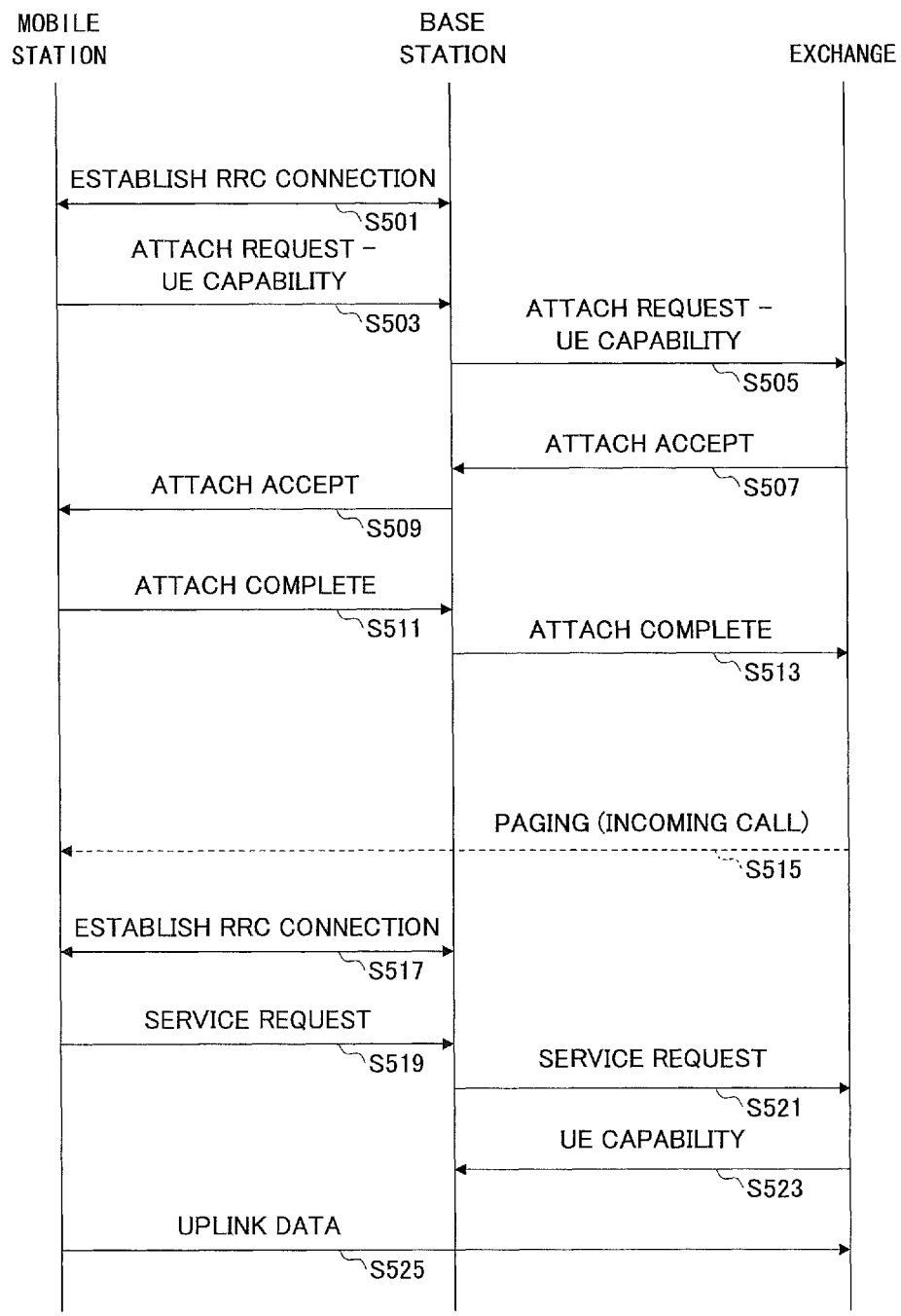
FIG. 7 shows an exemplary sequence diagram for transmitting an information element between a mobile station and a base station.

With reference to FIG. 7, a method of transmitting an information element from the mobile station to the base station is described below.

Upon roaming into another frequency band, the mobile station establishes an RRC Connection with the base station (S501). Then, the mobile station transmits an Attach Request to an exchange (mobility management entity (MME)) (S503, S505). The Attach Request is used to report a UE Capability. The mobile station reports the UE Capability including at least one of the three information elements (1)-(3). For example, the mobile station may set the information elements (1)-(3) to SupportedBandListUTRA in RF-Parameters of the UE Capability, because SupportedBandListUTRA indicates information about a supported frequency band. The exchange stores the UE Capability and transmits an Attach Accept to the mobile station (S507, S509). Then, the mobile station transmits an Attach Complete to the exchange (S511, S513).

Upon the arrival of an incoming call, the mobile station receives a paging (S515). Upon originating a call, this step S515 is not performed. Before transmitting data, the mobile station establishes an RRC Connection with the base station (S517). When the mobile station transmits a Service Request to the exchange (S519, S521), the exchange transmits the stored UE Capability to the base station (S523). In this manner, the base station receives the information element and controls communications with the mobile station.

Although not shown in FIG. 7, when the exchange does not store the UE Capability for some reason, the base station instructs the mobile station to report the UE Capability to the base station (UE Capability Enquiry), and then the mobile station transmits the UE Capability to the base station (UE Capability Information).

<Effects of an Embodiment of the Present Invention>

As described above, according to an embodiment of the present invention, roaming of a mobile station is enabled even though frequency allocation is different depending on countries.

A base station can determine whether communications are allowed based on the information elements (1)-(3), and accordingly can prohibit unfavorable communications. By allowing communications, increase in roaming revenue and an improvement in customer convenience can be achieved.

In addition, by reporting a UE Capability including the information elements (1)-(3), the information element can be reported to the base station by using an operational flow of transmitting and receiving the UE Capability between the mobile station and the base station.

For convenience of explanation, the base station and the mobile station according to the embodiments of the present invention have been described with reference to functional block diagrams, but the base station and the mobile station may be implemented in hardware, software, or combinations thereof. In addition, two or more embodiments or modifications may be combined as appropriate.

While the embodiments of the present invention are described above, the present invention is not limited to the these embodiments, and variations, modifications, alterations, and substitutions can be made by those skilled in the art without deviating from the spirit of the present invention.

The present international application claims priority from Japanese Patent Application No. 2010-141082 filed on Jun. 21, 2010, the entire contents of which are hereby incorporated herein by reference.

[Description of Notations]
10 mobile station
101 information element generating unit
103 transmitting unit
20 base station
201 receiving unit
203 communication allowing and prohibiting unit
205 transmission and reception band determining unit

The invention claimed is:

1. A mobile station comprising: where the mobile station supports a first frequency band and a second frequency band, an information element generating unit configured to generate an information element indicating whether a receiver sensitivity is degraded in the second frequency band when the second frequency band is narrower than the first frequency band while the separation between a transmission frequency and a reception frequency is the same between the first and second frequency bands, and whether transmission and reception bands of the mobile station correspond to a portion of a bandwidth of the second frequency band, when the mobile station roams from the first frequency band to the second frequency band; and a transmitting unit configured to transmit the generated information element to a base station; wherein the information element further indicates whether a certificate has been obtained for communications in the second frequency bands, and a base station control unit allows or prohibits communications with the mobile station, when the received information element indicates that the certificate has not been obtained for communications in the second frequency band.

2. The mobile station as claimed in claim 1, wherein
the transmitting unit transmits the generated information element together with a mobile station capability indicating a capability of the mobile station on a control channel.

3. A base station comprising: where a mobile station supports a first frequency band and a second frequency band, a receiving unit configured to receive an information element indicating whether a receiver sensitivity is degraded in the second frequency band when the second frequency band is narrower than the first frequency band while the separation between a transmission frequency and a reception frequency is the same between the first and second frequency bands, and whether transmission and reception bands of the mobile station correspond to a portion of a bandwidth of the second frequency band, when the mobile station roams from the first frequency band to the second frequency band; and a base station control unit configured to control communications with the mobile station based on the received information element; wherein the information element further indicates whether a certificate has been obtained for communications in the second frequency bands, and the base station control unit allows or prohibits communications with the mobile station, when the received information element indicates that the certificate has not been obtained for communications in the second frequency band.

4. The base station as claimed in claim 3, wherein
the control unit allows or prohibits communications with the mobile station, when the received information element indicates that the receiver sensitivity is degraded in the second frequency band.

5. The base station as claimed in claim 3, wherein
the control unit allows communications with the mobile station in a frequency range different from the second frequency band, when the received information element indicates that the receiver sensitivity is degraded in the second frequency band.

6. The base station as claimed in claim 3, wherein
the information element further indicates whether a certificate has been obtained for communications in the second frequency bands, and
the control unit allows or prohibits communications with the mobile station, when the received information element indicates that the certificate has not been obtained for communications in the second frequency band.

7. The base station as claimed in claim 3, wherein
the information element further indicates whether a certificate has been obtained for communications in the second frequency bands, and
the control unit allows communications with the mobile station in a frequency range different from the second frequency band, when the received information element indicates that the certificate has not been obtained for communications in the second frequency band.

8. The base station as claimed in claim 3, wherein
the control unit allows communications with the mobile station in the portion of the bandwidth of the second frequency band, when the received information element indicates that the transmission and reception bands of the mobile station correspond to the portion of the bandwidth of the second frequency band.

9. A transmission method in a mobile station comprising the steps of: where the mobile station supports a first frequency band and a second frequency band, generating an information element indicating whether a receiver sensitivity is degraded in the second frequency band when the second frequency band is narrower than the first frequency band while the separation between a transmission frequency and a reception frequency is the same between the first and second frequency bands, and whether transmission and reception bands of the mobile station correspond to a portion of a bandwidth of the second frequency band, when the mobile station roams from the first frequency band to the second frequency band; and transmitting the generated information element to a base station; wherein the information element further indicates whether a certificate has been obtained for communications in the second frequency bands, and a base station control unit allows or prohibits communications with the mobile station, when the received information element indicates that the certificate has not been obtained for communications in the second frequency band.

10. A communication control method in a base station comprising the steps of: where a mobile station supports a first frequency band and a second frequency band, receiving an information element indicating whether a receiver sensitivity is degraded in the second frequency band when the second frequency band is narrower than the first frequency band while the separation between a transmission frequency and a reception frequency is the same between the first and second frequency bands, whether a certificate has been obtained for communications in the second frequency band, and whether transmission and reception bands of the mobile station correspond to a portion of a bandwidth the second frequency band, when the mobile station roams from the first frequency band to the second frequency band; and controlling communications with the mobile station based on the received information element; wherein the information element further indicates whether a certificate has been obtained for communications in the second frequency bands, and a base station control unit allows or prohibits communications with the mobile station, when the received information element indicates that the certificate has not been obtained for communications in the second frequency band.

* * * * *